(12) United States Patent
Anderson

(10) Patent No.: US 11,876,240 B2
(45) Date of Patent: Jan. 16, 2024

(54) PORTABLE ENERGY STORAGE AND POWER SUPPLY SYSTEM

(71) Applicant: Sean Anderson, Covina, CA (US)

(72) Inventor: Sean Anderson, Covina, CA (US)

(*) Notice: Subject to any disclaimer, the term of this patent is extended or adjusted under 35 U.S.C. 154(b) by 118 days.

(21) Appl. No.: 17/648,895

(22) Filed: Jan. 25, 2022

(65) Prior Publication Data

US 2023/0238635 A1 Jul. 27, 2023

(51) Int. Cl.
*H01M 50/247* (2021.01)
*H01M 50/213* (2021.01)
*H02J 7/00* (2006.01)

(52) U.S. Cl.
CPC ....... *H01M 50/247* (2021.01); *H01M 50/213* (2021.01); *H02J 7/0013* (2013.01); *H01M 2220/30* (2013.01)

(58) Field of Classification Search
CPC ............ H01M 50/247; H01M 50/213; H01M 2220/30; H01M 50/20
See application file for complete search history.

(56) References Cited

U.S. PATENT DOCUMENTS

| | | | |
|---|---|---|---|
| 8,080,972 B2 | 12/2011 | Smith | |
| 9,385,351 B2 | 7/2016 | Workman | |
| 9,923,393 B2 | 3/2018 | Workman | |
| 9,979,215 B2 | 5/2018 | Workman | |
| 2012/0274266 A1* | 11/2012 | Yip | H02J 7/00036 320/106 |
| 2016/0013675 A1* | 1/2016 | Workman | H02J 7/00 320/112 |
| 2021/0050568 A1* | 2/2021 | Yang | H01M 10/643 |

* cited by examiner

*Primary Examiner* — Brian R Ohara
*Assistant Examiner* — Michelle T Leonard
(74) *Attorney, Agent, or Firm* — KOSIP Law LLP

(57) ABSTRACT

A battery-based portable power supply includes a battery pack that is configured to protect the batteries and components therewithin. An outer tube protects inner components from impacts that can be expected in transport and usage. A suspension system within a battery pack of the power supply protects the batteries from jolts and bumps. The batteries can be removed and replaced. A switch structure for actuating the electrical outlet is disposed within the battery pack. The switch structure is actuated by compressing the battery pack from outside.

16 Claims, 12 Drawing Sheets

PORTABLE ENERGY STORAGE AND POWER SUPPLY SYSTEM

BACKGROUND

The present disclosure relates to the field of portable battery-based power supply systems.

Power supply systems often include one or more batteries that may be charged to store electrical energy. Such electrical energy can be used to power electronic devices such as mobile telephones, cameras, air or water pumps, and the like when access to traditional power sources is limited. A user can couple the power supply system to an electronic device to power the electronic device and/or charge the battery of the electronic device.

Portable power supply systems for use in remote and/or outdoor environments can face substantial challenges. For example, such environments may include harsh conditions, possibly exposing the power supply system to corrosive and/or damaging elements. Also, transportation of portable power supplies over rough roads and/or via backpacking can lead to such rough treatment, as the power supply may be dropped and/or encounter impacts from other equipment. Such harsh conditions and treatment can make portable power supplies particularly vulnerable to component breakage and possible fouling of batteries.

SUMMARY

The present disclosure discloses aspects that improve battery-based portable power supplies. For example, a battery pack of the power supply system can be enclosed within a durable housing, sealing the internal components from destructive environmental factors. The battery pack can include a plurality of batteries configured to power an electric outlet that is accessible from outside the battery pack. The battery pack can be opened, enabling the replacement of spent batteries. Within the battery pack, a carriage can hold batteries so that spring-biased contact rods physically support the opposite poles of the batteries and establish an electrical circuit connection. The carriage itself can be suspended by springs between a support structure so as to be at least partially protected from impact forces. An internal switch can activate the circuit so that the electric outlet is energized but without exposing switchgear to the outside of the housing, where it is likely to become damaged. The internal switch can include two electrically conductive rods or other structures interposed in a circuit with the batteries. In an at-rest configuration, springs within the battery pack urge the rods to be spaced from one another, and the switch is open. When the battery pack is compressed from the outside, the rods can be pushed into engagement with one another, closing the switch and energizing the electric outlet. Compression of the battery pack can be provided, for example, by straps that extend between opposing ends of the battery pack and which are tightened and held in place by a ratchet of other specific structures. When the ratchet is tightened sufficiently, the battery pack is compressed, and the switch is closed. When the ratchet is released, the rods are again biased out of contact with one another, and the switch is opened. In a portable power supply system, the battery pack can be included in a carrier to which other items, such as tubes for spare batteries, can be attached. Shoulder straps can also be attached to the carrier so that the portable power supply system can be transported to remote locations.

In accordance with one embodiment, the present specification provides a portable battery pack having a housing that encloses a plurality of batteries arranged in a circuit so as to power an electrical outlet, and the electrical outlet may be accessible through the housing. A carriage is disposed of within the housing, and the carriage is configured to support the plurality of batteries and a plurality of contacts that are biased into electrical contact with the batteries. A support structure has a first portion and a second portion, the carriage being suspended by springs between the first portion and the second portion. The carriage is at least partially protected from impact forces that may be imparted to the housing.

The carriage can comprise a plurality of blocks that support a plurality of tubes, each tube being configured to hold a plurality of batteries. The carriage can also comprise opposing end blocks, and each end block closes opposing ends of the tubes. The blocks can each comprise a plurality of separately formed disks that are stacked upon one another and held together without adhesive. The batteries can be arranged in an electrical series configuration;

The portable battery pack can additionally comprise a first switch structure enclosed within the housing and connected electrically in series with the batteries, and a second switch structure enclosed within the housing and electrically communicating with the electric outlet so that the electric outlet is energized when the first switch structure is in contact with the second switch structure.

A switch biasing spring within the housing can bias the first switch structure away from the second switch structure. The housing can have a first portion and a second portion, the first portion being movable relative to the second portion, the battery pack configured so that when the battery pack is compressed, the first portion moves relative to the second portion so as to overcome the switch biasing spring and place the first switch structure into contact with the second switch structure.

The portable battery pack can be combined with a compression structure configured to compress the first portion of the housing relative to the second portion of the housing to a compressed configuration sufficient to place the first switch structure in contact with the second switch structure and to maintain the housing in the compressed configuration. The compression structure can comprise one or more straps configured to be tightened by a ratchet.

Each of the plurality of contacts can comprise an elongated rod that is spring-biased toward an adjacent one of the plurality of batteries.

In connection with another embodiment, the present specification provides a portable battery pack comprising a first portion and a second portion. The first portion is movable between an engaged configuration in which the first portion engages the second portion and a removed configuration in which the first portion is removed from the second portion. An electric outlet is accessible from outside the battery pack. At least one battery tube is defined in the second portion, the battery tube being configured to hold a plurality of batteries so that a first pole of the plurality of batteries is electrically connected to the electric outlet. A contact member can be carried by the first portion and is configured so that when the first portion is in the engaged configuration, the contact member is electrically engaged with a second pole of a plurality of batteries. A first switch member can be disposed in the first portion and electrically communicating with the contact member. A second switch member can be disposed in the second portion and electrically communicating with the electric outlet. When the first and second portions are in the engaged configuration, the first portion is movable between a first position and a second position, the first switch member being spaced from the second switch member in the first position, the first switch member being in contact with the second switch member in the second position, and wherein the first portion is biased toward the first position. In the second position, the batteries are electrically connected to the electric outlet so that the electric outlet is energized.

A housing can enclose the battery pack so that the first switch member and second switch member are not accessible from outside the battery pack, the housing comprising a first housing member and a second housing member that are movable relative to one another. In some variations, the battery pack is configured so that longitudinally compressing the battery pack moves the first portion from the first position to the second position.

In another variation, the first portion is constrained to move only longitudinally between the first position and the second position.

Some variations can employ a switch biasing spring within the housing that biases the first portion toward the first position.

In some versions, the first switch member comprises an elongated rod. In some such embodiments, the second portion can comprise a block comprising a non-conductive material, the block having a longitudinally extending receiver space, and wherein the elongated rod fits into the receiver space when the first portion and second portion are in the engaged configuration, the receiver space configured to constrain the elongated rod to move only longitudinally.

BRIEF DESCRIPTION OF THE DRAWINGS

These and other features and advantages of the various embodiments disclosed herein will be better understood with respect to the following description and drawings, in which like numbers refer to like parts throughout, and in which.

DESCRIPTION

Figure 9:
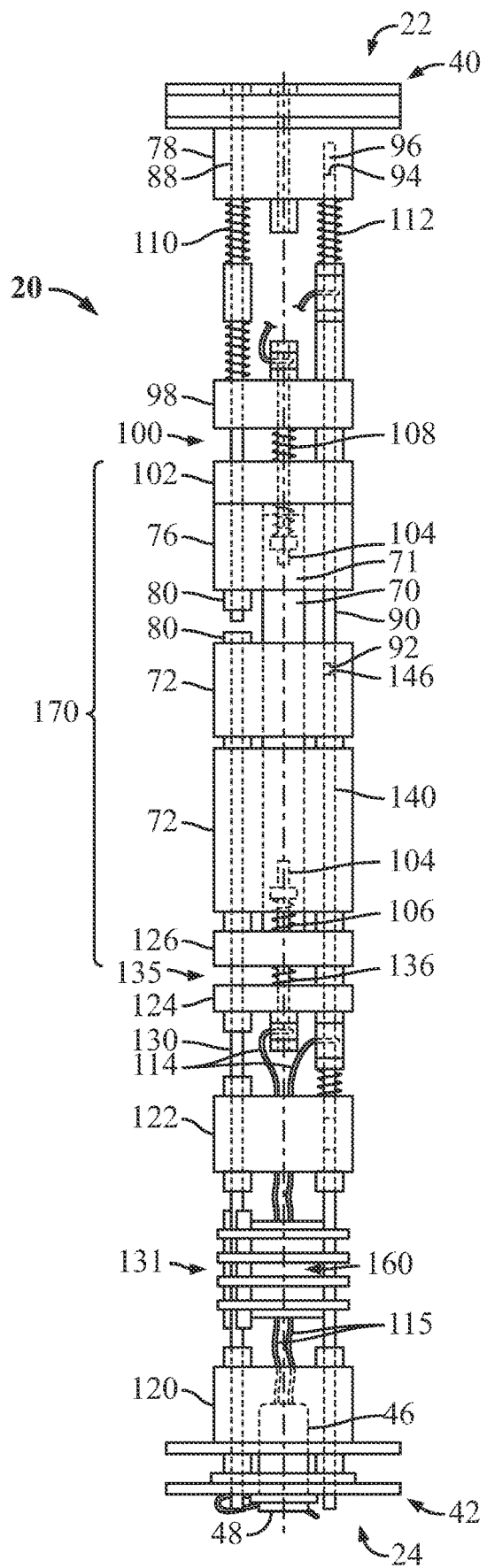
FIG. 9 shows the battery pack of FIG. 8 in an assembled configuration.

The present specification describes embodiments of a battery-based portable power supply system 50 (FIG. 4) configured for use in remote locations and harsh conditions. A battery pack 20 (FIGS. 1, 4) of the power supply system 50 is enclosed within a durable sealed housing 28, sealing the internal components from destructive environmental factors and impacts. The battery pack 20 includes a plurality of batteries 26 (FIG. 10) configured to power an electric outlet 46 (FIG. 3) that is accessible from outside the battery pack 20. The battery pack 20 can be opened (FIGS. 6-7), enabling the replacement of spent batteries 26 (i.e., depleted batteries). Within the battery pack 20, a carriage 170 (FIG. 9) holds a plurality of batteries 26 so that spring-biased contact rods 104 physically support the batteries 26 and establish an electrical circuit connection. The carriage 170 itself can be suspended by springs 108, 136 between a support structure 98, 124 (FIG. 9). As such, when the battery pack 20 encounters impacts, impact forces will be absorbed by the springs 108, 136, and only minimally communicated to the suspended carriage 170 (and associated batteries 26). An internal switch can be provided to activate the circuit so that the electric outlet 46 is energized. The internal switch can include two electrically conductive rods 90, 140 (FIGS. 9-10) or other structures interposed in a circuit with the batteries 26. In an at-rest configuration (FIG. 11), springs 110 within the battery pack 20 urge the rods 90, 140 to be spaced from one another, and the switch is open. There is no power to the electric outlet 46. When the battery pack is compressed from the outside (FIG. 12), the rods 90, 140 can be pushed into engagement with one another, closing the switch and energizing the electric outlet 46. Compression of the battery pack 20 can be provided, for example, by straps 60 that extend between opposing ends of the battery pack 20, and which are tightened and held in place by a ratchet 62. When ratchet 62 is tightened sufficiently, the battery pack 20 is compressed, and the switch is closed. When the ratchet 62 is released, the rods 90, 140 are again biased out of contact with one another, and the switch is opened. In a portable power supply system 50, the battery pack 20 can be included in a carrier 52 to which other items, such as tubes 64 for spare batteries, can be attached. Shoulder straps 56 can also be attached to carrier 52 so that the portable power supply system 50 can be transported to remote locations.

Figure 1:
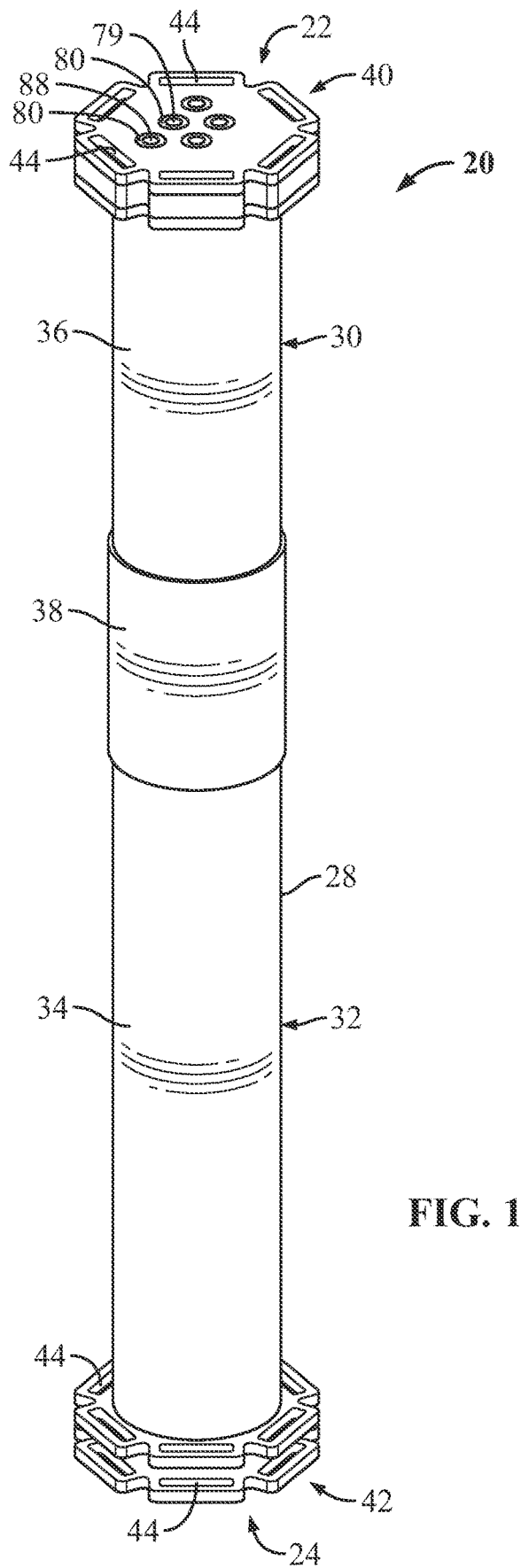
FIG. 1 is a perspective view of a battery pack.

With reference to FIG. 1, a battery pack 20 is elongated, extending from a proximal end 22 to a distal end 24. The battery pack 20 is configured to securely hold a plurality of batteries 26 (see FIGS. 2 and 6) within a tubular housing or cover 28 (see FIG. 1). A plug portion 30 (see FIG. 1) of the battery pack 20 is configured to be removable from a body portion 32, enabling access to insert and remove the batteries 26. The tubular housing 28 can include a body tube 34, a plug tube 36, and a connector tube 38 attached to the body tube 34 and configured to receive the plug tube 36. The body portion 32 is comprised of body tube 34 and the connector tube 38. Plug portion 30 is comprised of plug tube 36. A proximal flange 40 is disposed at the proximal end 22, and a distal flange 42 is disposed at the distal end 24. The proximal flange 40 and distal flange 42 each extend radially outwardly relative to the tubular housing 28, and each comprises a plurality of strap receivers 44.

Figure 3:
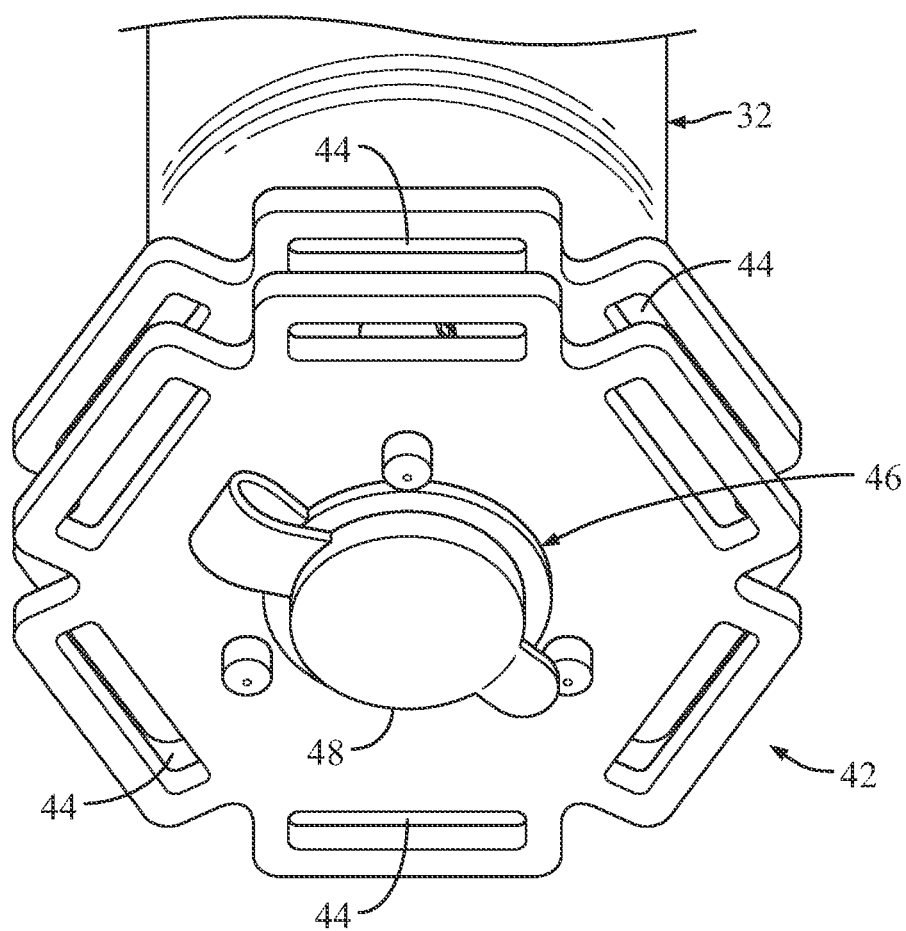
FIG. 3 is a perspective view of a distal end of the battery pack of FIG. 1.

With reference to FIG. 3, an electrical outlet 46 is disposed at the distal end 24 (See FIG. 1) of the battery pack 20, and may extend through the distal flange 42. The electrical outlet 46 can take various specific forms and configurations. In the illustrated embodiment, the electrical outlet 46 is a conventional 12V DC outlet socket (e.g., cigarette lighter socket) as is commonly used in automobiles. Preferably, cover 48 selectively closes access to the electrical outlet 46.

Figure 4:
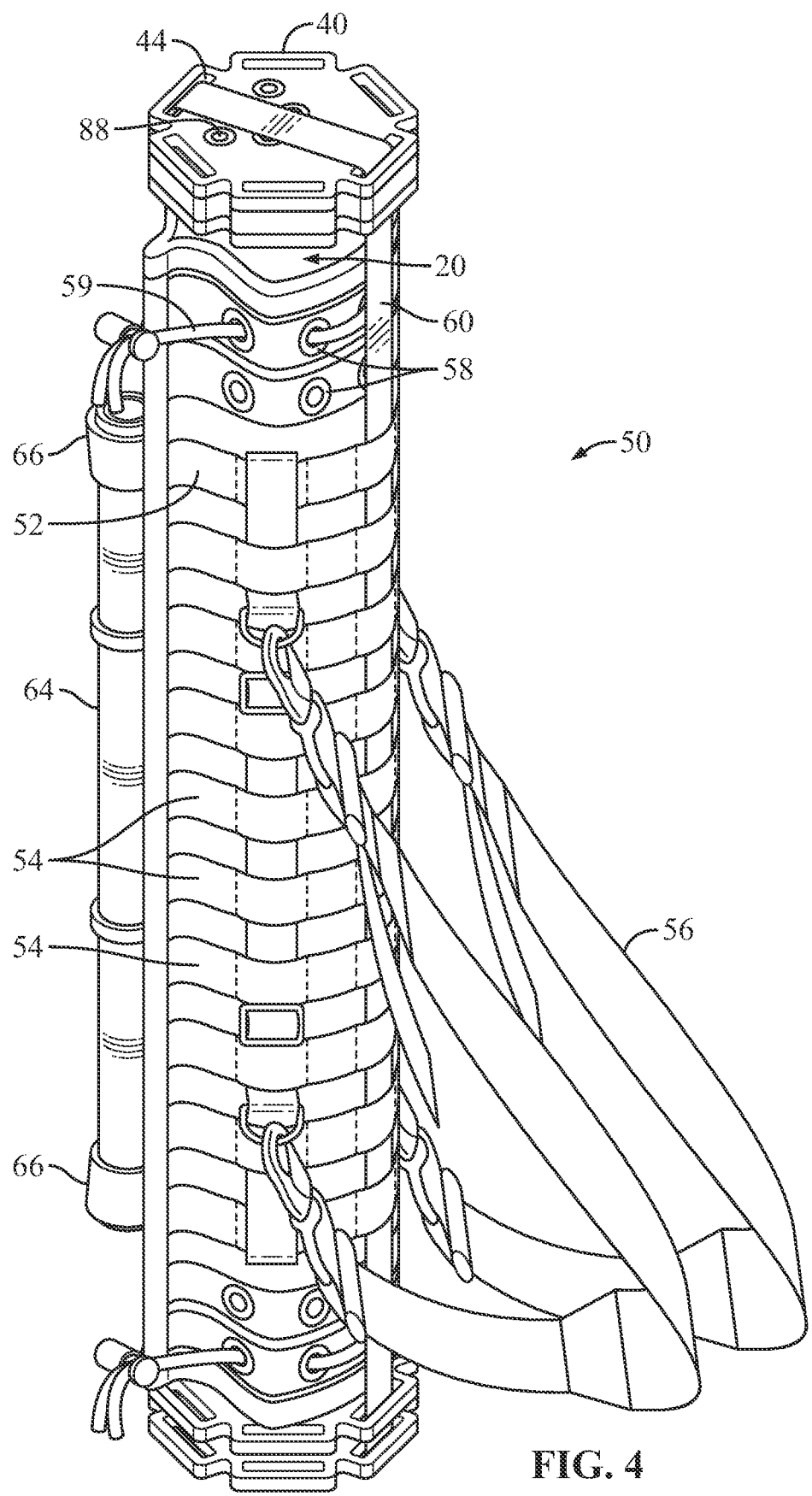
FIG. 4 is a front perspective view of an embodiment of a portable power supply system using the battery pack of FIG. 1.
Figure 5:
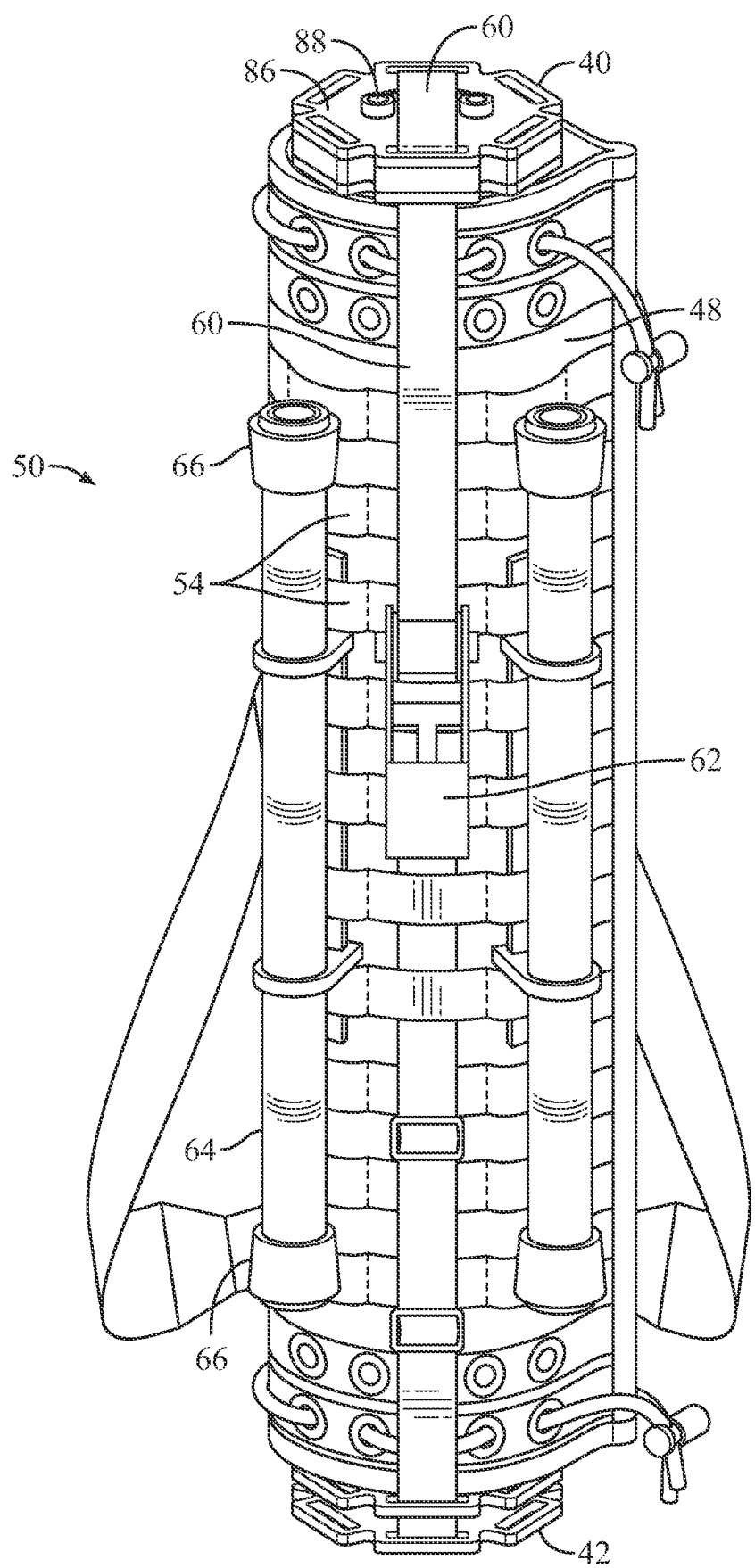
FIG. 5 is a back perspective view of the portable power supply system of FIG. 4.

With reference to FIGS. 4 and 5, a power pack system 50. The power pack system 50 includes the battery pack 20 and a tubular carrier 52. The battery pack 20 may be disposed within the elongated tubular carrier 52. Preferably, carrier 52 is open at one or both of its ends so that both the proximal flange 40 and distal flange 42 are exposed and accessible when the battery pack 20 is within carrier 52. More particularly, the electrical outlet 46 is easily accessible when the battery pack 20 is within carrier 52. The carrier 52 can be configured with a pattern of MOLLE straps 54, enabling equipment and features to be easily attached thereto. For example, as shown in FIG. 4, a pair of shoulder straps 56 can be attached to MOLLE straps 54 of the carrier 52 so that the power pack system 50 can be worn as a backpack. A plurality of grommets 58 formed at either end of the carrier 52 can accommodate a tie string 59, enabling the carrier 52 to be tightened closer to the battery pack 20. One or more spare tubes 64 can be attached to the carrier 52, such as via the MOLLE straps 54. Each spare tube 64 can be configured to hold a plurality of batteries 26 to replace the batteries 26 within the battery pack 20. The spare tubes 64 preferably include stoppers 66 at one or both ends to allow selective access to the batteries 26 therewithin while protecting the batteries 26 from environmental factors.

Securement straps 60 hold the battery pack 20 within the carrier 52. As shown in FIGS. 4 and 5, securement straps 60 can extend through the MOLLE strapping 54 of the carrier 52 and through strap receivers 44 of the proximal flange 40 so as to extend over the proximal flange 40. Securement straps 60 can also extend through opposing strap receivers 44 of the distal flange 42, but preferably do not extend over the distal flange 42 so that the electrical outlet 46 remains accessible when the straps are attached. A strap tightener, which in the illustrated embodiment is a ratchet 62, is attached to the securement straps 60 and configured to hold the securement straps 60 in place so that the battery pack 20 is held in place within the carrier 52.

Figure 6:
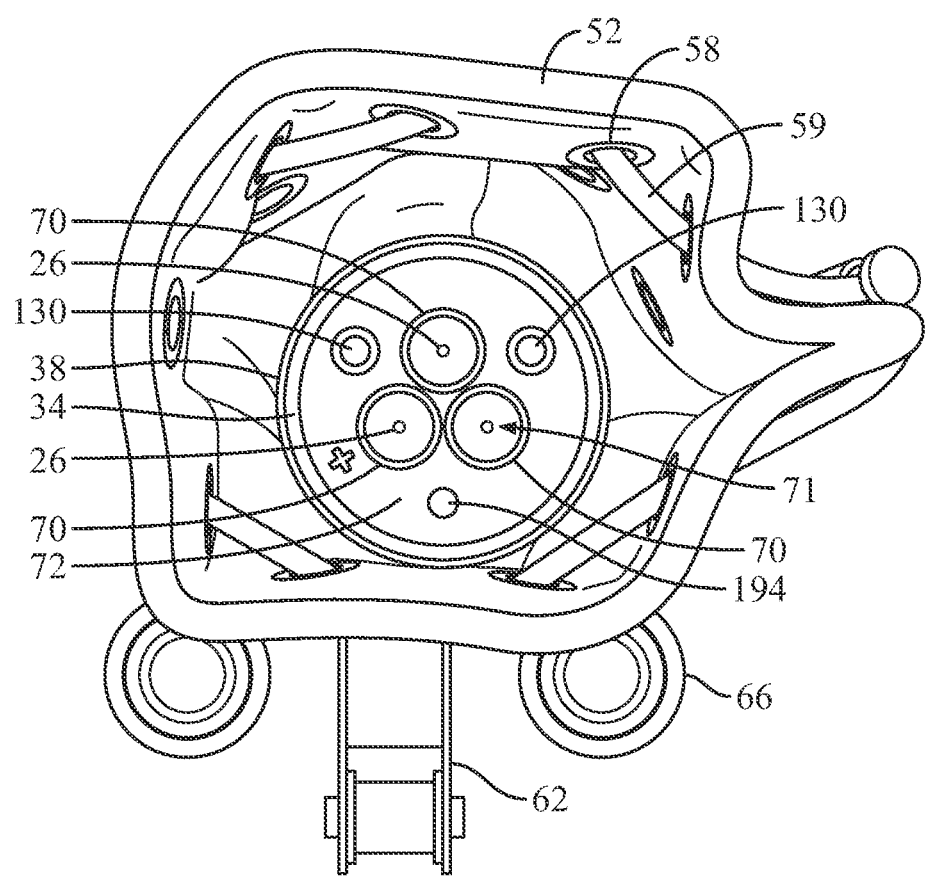
FIG. 6 is an end view of the portable power supply system of FIG. 4 with a plug portion of the battery pack removed.
Figure 7:
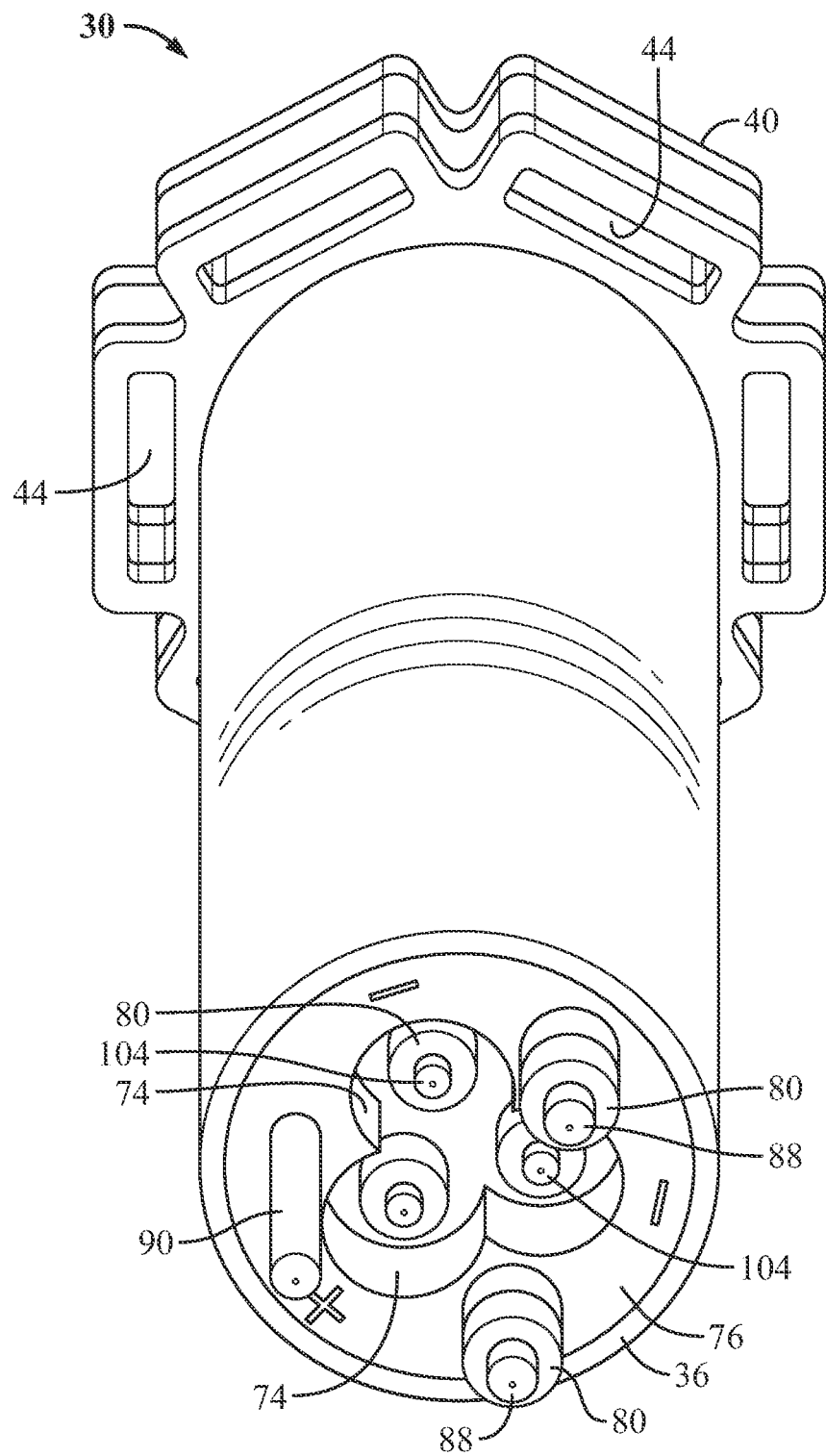
FIG. 7 is an end view of a plug portion of the battery pack after having been removed from the battery pack.

With reference next to FIGS. 6 and 7, the plug portion 30 of the battery pack 20 can be removed from the body portion 32 while the body portion 32 is held within the carrier 52. This can be accomplished by first loosening the ratchet 62 and removing the securement straps 60 from the proximal flange 40. The securement straps 60 can remain attached to the distal flange 42. As shown, a plurality of battery tubes 70 are supported within the body portion 32 and configured to receive batteries 26 in a battery space 71 defined therewithin. In the illustrated embodiment, the battery pack 20 includes three battery tubes 70, which are each configured to hold two batteries 26, so that the battery pack 20 holds a total of six batteries 26. As discussed in more detail below, preferably, the batteries 26 are arranged electrically in series.

Figure 8:
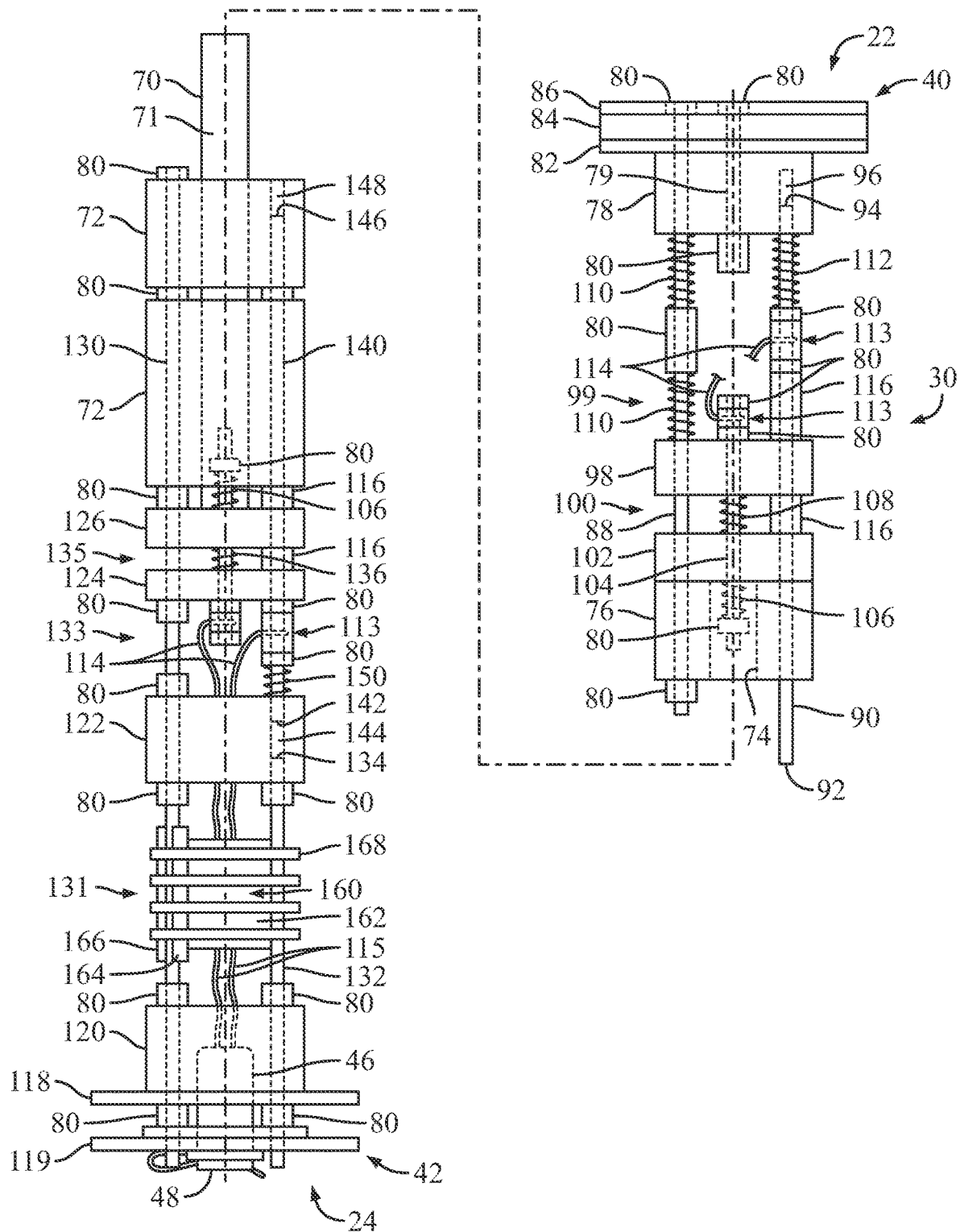
FIG. 8 is a simplified schematic view of a main portion and a plug portion of the battery pack with the tubular housing removed.

Continuing with reference to FIGS. 6 and 7, and with additional reference to FIG. 8, the battery tubes 70 (see FIGS. 6 and 8) preferably are held within body tube blocks 72. Tube receivers 74 are formed in a distal plug block 76 of the plug portion 30, and are configured to slide over and receive the battery tubes 70 when the plug portion 30 is attached to the body portion 32.

With particular reference to FIGS. 8 and 9, an embodiment of the battery pack 20 is schematically illustrated with the tubular housing 28 removed. Notably, certain other structures have are not depicted in FIGS. 8 and 9 in order to simplify the figures. For example, only one battery tube 70 and associated structure is depicted in FIGS. 8 and 9, while the embodiment actually includes three battery tubes (see FIGS. 6 and 7).

The plug portion 30 includes a plug proximal block 78 attached to the proximal flange 40 via a plurality of connector rods 79 (see also FIG. 1) that extend through the plug proximal block 78 and proximal flange 40. Stops 80 are attached to the connector rods 79 at both ends. The stops 80 are rigidly attached to the connector rods 79—such as by a screw or adhesive—so as to effectively create a block at which the connector rod 79 has a greater diameter. As such, the proximal block 78 and proximal flange 40 are sandwiched between the stops 80, and thus held together. As shown, the connector rods 79 and stops 80 are generally flush with the surface of the proximal flange 40.

The illustrated proximal flange 40 comprises a rigid support flange portion 82, a rubber flange portion 84, and a plastic outer flange portion 86. The outer flange portion 86 can be made of various types of plastic and preferably is made of a durable material that can absorb impacts, scrapes and the like without incurring major damage, such as an ultra high molecular weight polyethylene. Preferably, and as shown, the strap receivers 44 are formed through all layers of the proximal flange 40. Also, the outer flange portion 86 can have cavities formed therein to receive the connector rods 79 and associated stops 80 so that the stops 80 and rods 79 are flush with the surface of the outer flange portion 86.

A pair of elongated plug support rods 88 (see FIGS. 1, 8, and 9) may extend the length of the plug portion 30, from the outer flange portion 86 to distally beyond the distal plug block 76. Stops 80 are placed at the proximal ends of the plug support rods 88 and adjacent, but spaced from, the distal ends of the plug support rods 88. Preferably, the support rods 88 are made of a rigid and durable material, such as extruded aluminum. The stops 80 are also preferably made of a rigid and durable material. An elongated plug power rod 90 extends from within the proximal plug block 78 through the plug distal block 76 to a distal end 92 that is spaced distally from the distal plug block 76. Preferably the distal end 92 of the plug power rod 90 extends farther distally than the plug support rods 88. A proximal end 94 of the plug power rod 90 preferably fits in a receiver space 96 defined in the plug proximal block 78. The receiver space 96 is shaped complementarily to the power rod 90 so that the plug power rod 90 can slide therewithin, and there is space for the proximal end 94 to move longitudinally while staying within the receiver space 96. The power rod 90 preferably is formed of an electrically conductive material, such as copper.

A proximal suspension block 98 is distally spaced from the plug proximal block 78, and a plug suspension space 99 is defined therebetween. A proximal carriage suspension space 100 is disposed between the proximal suspension block 98 and a proximal carrier end block 102, which can abut the plug distal block 76. Preferably, the tube receivers 74 formed in the plug distal block 76 do not extend into the proximal carrier end block 102. The plug support rods 88 and plug power rod 90 extend through spaces 99, 100 and blocks 98, 102.

With continued reference to FIG. 8 and also FIG. 7, in connection with each of the three tube receivers 74 formed in the distal plug block 76, a contact rod 104 extends through the proximal suspension block 98 and proximal carriage end block 102 so that a proximal portion of the contact rod 104 extends into the proximal suspension space 99 and a distal portion of the contact rod 104 extends into a respective one of the tube receivers 74. A stop 80 is placed adjacent but spaced from the distal end of the contact rod 104. A contact biasing spring 106 is interposed between a distal surface of the proximal carriage end block 102 and the adjacent stop 80 so as to bias the contact rod 104 distally. A stop 80 is also placed adjacent but spaced from the proximal end of the contact rod 104 so as to be adjacent to the proximal surface of the proximal suspension block 98. As such, the biasing spring 106 urges the contact rod 104 distally, and the proximal stop 80 engages the proximal surface of the proximal suspension block 98 to limit the distal travel of the contact rod 104. A connection zone is disposed at the proximal end of each contact rod 104, and a wire 114 can connect to the contact rod 104 in connection zone.

Continuing with reference to FIGS. 8 and 9, a proximal carriage suspension spring 108 is arranged over each contact rod 104 in the proximal carriage suspension space 100 between the proximal suspension block 98 and the proximal carriage end block 102. The proximal carriage suspension springs 108 thus operate between blocks 98, 102. In the proximal suspension space 99, each plug support rod 88 includes a pair of proximal suspension springs 110 disposed over the rods 88 and separated by stops 80. The suspension springs 108, 110 are configured to generally keep the plug proximal block 78, proximal suspension block 98, and proximal carriage end block 102 in place relative to one another while allowing some movement so as to absorb shocks and other compressive incidents.

A proximal power rod biasing spring 112 is disposed over the plug power rod 90, operating between a stop 80 on the plug power rod 90 and the distal surface of the plug proximal block 78. The proximal power rod biasing spring 112 thus biases the proximal power rod 90 distally. A pair of stops 80 on the plug power rod 90 define a connection zone 113 in which a wire 114 is attached to the plug power rod 90. Wires 114 extend between connections zones 113 of contact rods 104, and the plug power rod 90 to facilitate an electrical series connection of the batteries and the plug power rod 90.

Figure 10:
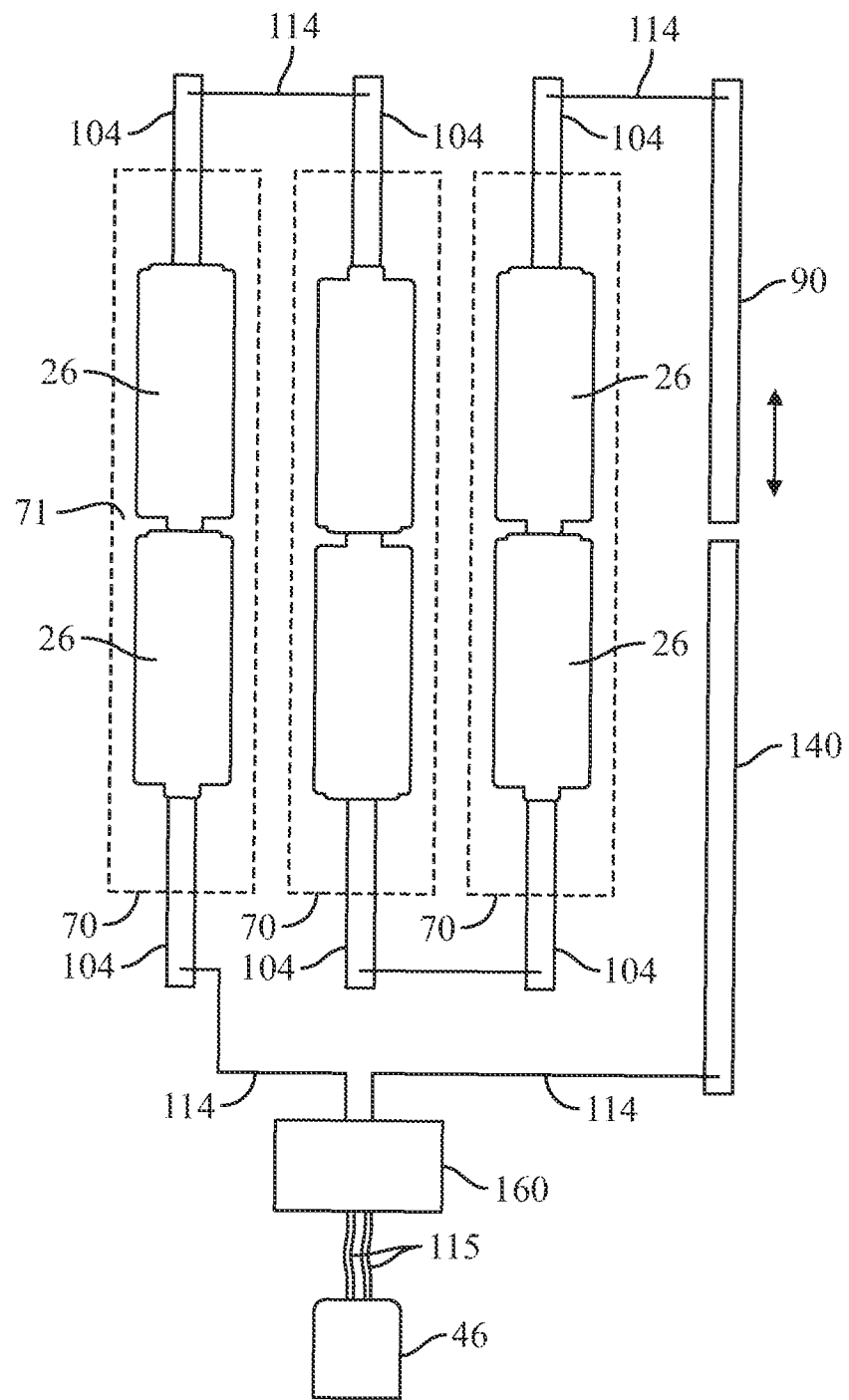
FIG. 10 is a schematic diagram of an electrical circuit of the battery pack of FIG. 1.

As FIGS. 8 and 9 do not show all of the battery tubes 70 and contact rods 104, not all connections of the wires 114 are shown in these figures. With reference next to FIG. 10, a schematic diagram of a battery circuit shows an arrangement of the batteries 26 in the battery tubes 70 and in contact with the contact rods 104, which are connected by wires 114 so that the batteries 26 are arranged electrically in series with the plug power rod 90.

Referring again to FIGS. 8 and 9, a flexible tubular cover 116 is disposed over the plug power rod 90, extending from stop 80 to the proximal surface of the proximal suspension block, 98. The flexible tubular cover 116 can allow some flexibility but generally restricts distal movement of the plug power rod 90 in opposition to the plug power rod biasing spring 112. It also electrically insulates the plug power rod 90. A similar tubular cover 116 can be placed over the plug power rod 90 in the proximal carriage suspension space 100.

With continued reference to FIG. 8, and also FIG. 3, the distal flange 42 comprises a first flange member 118 and a second flange member 119 that are spaced apart from one another. Both flange members 118, 119 include strap receivers 44 and are configured to selectively receive securement straps 60. Both flange members 118, 119 are made of strong and durable aluminum. In some variations, the second flange member 119 can be made of another durable material and/or can be configured to shield the first flange member 118 from impacts and the like so as to protect a securement strap 60 that can be attached to the first flange member 118.

Continuing with reference to FIGS. 8 and 9, the body portion 32 comprises a distal block 120, a conditioner block 122 spaced proximally from the distal block 120, a distal suspension block 124 spaced proximally from the conditioner block 122, a distal carriage end block 126 spaced proximally from the distal suspension block 124, and the body tube blocks 72 spaced proximally from the distal carriage end block 126.

A pair of elongated body support rods 130 extend through each of these blocks, extending from distal of the distal flange 42 to proximal of the body tube blocks 72. A stop 80 is placed at the proximal end of each body support rod 130 immediately adjacent the proximal surface of the proximal-most body tube block 72. Stops 80 are also placed along the body support rods 130 immediately adjacent the distal surface of the distal-most body tube block 72 and proximal surface of the distal carriage end block 126. As such, the body tube blocks 72 are blocked from moving longitudinally over the body support rods 130, and the distal carriage end block 126 is blocked by the stop 80 from moving proximally over the body support rods 130. Similarly, stops 80 are placed along the body support rods 130 distal of the first flange member 118, at the proximal surface of the distal block 120, the distal and proximal surfaces of the conditioner block 122 and the distal surface of the distal suspension block 124. As such, the first flange member 118, distal block 120 and conditioner block 122 are blocked from moving longitudinally over the body support rods 130, and the distal suspension block 124 is blocked by the stop 80 from moving distally over the body support rods 130. In this manner, a power conditioning space 131 is defined between the distal block 120 and conditioner block 122, and a transition space 133 is defined between the conditioner block 122 and distal suspension block 124. Notably, however, the distal suspension block 124 and distal carriage end block 126 can move longitudinally relative to one another. A distal carriage suspension space 135 is defined between the distal suspension block 124 and the distal carriage end block 126. Three distal carriage suspension springs 136 longitudinally span the distal carriage suspension space 135. As shown in FIG. 9, each distal carriage suspension spring 136 can be generally collinear with one of the contact rods 104.

As shown in FIGS. 8 and 9, an elongated secondary support rod 132 extends from distal of the distal flange 42 into the conditioner block 122. The proximal end 134 of the secondary support rod 132 terminates within the conditioner block 122. Stops 80 are placed along the second support rod 132 at the distal surface of the conditioner block 122, the proximal surface of the distal block 120, and distal surface of the first flange portion 118. Preferably, the body support rods 130 and secondary support rod 132 are made of a rigid and durable material, such as extruded aluminum. Working together, the plug support rods 88, body support rods 130 and secondary support rod 132 provide support along the longitudinal axis of the battery pack 20, and also protect from damage that could otherwise accompany impacts forces from impacts to the battery pack 20 that are directed transversely to the battery pack's longitudinal axis.

Continuing with reference to FIGS. 8 and 9, an elongated medial power rod 140 is longitudinally aligned with the secondary support rod 132. A distal end 142 of the medial power rod 140 is disposed within a space 144 within the conditioner block 122, and the medial power rod 140 extends through the distal suspension block 124, distal carriage end block 126, and tube blocks 72 to terminate at a proximal end 146 within the proximal-most tube block 72. The medial power rod 140 preferably is formed of an electrically conductive material, such as copper. A power rod receiver 148 is defined in the tube block 72 proximal the proximal end 146. A stop 80 is placed on the medial power rod 140 within the transition space 133. A distal power rod spring 150 is disposed over the medial power rod 140 and contacts the proximal surface of the conditioner block 122 and the adjacent stop 80 so as to bias the medial power rod 140 proximally. Another stop 80 is placed on the medial power rod 140 adjacent the distal surface of the distal suspension block 124 so as to limit proximal travel of the medial power rod 140. The medial power rod 140 is configured to be slidably retained within the associated blocks. Flexible tubular covers 116 can be arranged over the medial power rod 140 in the spaces between the tube blocks 72, and the distal carriage end block 126 and distal suspension block 124. A connection zone 113 is defined between stops 80 on the medial power rod 140. A wire 114 is attached to the plug power rod 90 in connection zone 113.

Continuing with reference to FIGS. 8 and 9, elongated battery tubes 70 extend through the body tube blocks 72 and abut the proximal surface of the distal carriage end block 126. Similar to the arrangement in the plug member 30, in connection with each of the three tubes 70, a contact rod 104 extends through the distal suspension block 124 and distal carriage end block 126 so that a distal portion of the contact rod 104 extends into the transition space 133 and a proximal portion of the contact rod 104 extends into a respective one of the tubes 70 within the tube blocks 72. A stop 80 is placed adjacent but spaced from the proximal end of the contact rod 104. A contact biasing spring 106 is interposed between a proximal surface of the distal carriage end block 126 and the adjacent stop 80 so as to bias the contact rod 104 proximally. A stop 80 is also placed adjacent but spaced from the distal end of the contact rod 104 so as to be adjacent the distal surface of the distal suspension block 124. As such, the biasing spring 106 urges the contact rod 104 proximally, and the distal stop 80 engages the distal surface of the distal suspension block 124 to limit the proximal travel of the contact rod 104. A connection zone is disposed at the distal end of each contact rod 104, and a wire 114 can connect to the contact rod 104 in connection zone.

With continued reference to FIGS. 8 and 9, a power conditioner 160 can be mounted in the power conditioning space 131. As shown, the power conditioner 160 includes electronic components, such as a transformer and control circuitry, potted within a housing 162 for safety and protection from environmental factors. Preferably the power conditioner 160 is mounted in contact with the support rods 130, 132. A foam layer 164 can be disposed between an open end of the housing 162 and body support rods 130, and a plastic or rubber cover 166 can be further supplied. A plurality of straps 168 preferably secures the power conditioner 160 tightly to the support rods 130, 132 in a manner so that the power conditioner 160 will not move relative to the support rods 130, 132 and thus will be protected from damage that could result from impacts to the battery pack 20.

As shown in FIGS. 8 and 9, and additional reference to FIG. 10, contact rods 104 engage opposing poles of associated batteries 26. The contact rods 104 and proximal power rod 90 are connected by wires 114 so that the array of batteries 26 is in an electrical series configuration. Wires 114 from the medial power rod 140 and one of the contact rods 104 are directed from the transition space 133 through the conditioner block 122 and into the power conditioner space 131, supplying power from the batteries 26 to the power conditioner 160, which conditions the power and communicates conditioned power through output wires 115 to the electrical outlet 46. As such, a circuit extends through the batteries 26 and rods 104, 90, 140 to the power conditioner 160.

FIG. 9 shows the plug portion 30 engaged with the body portion 32. To engage the plug portion 30 with the body portion 32, the tube receivers 74 are aligned with the tubes 70, and the plug power rod 90 is aligned with the power rod receiver 148. The plug portion 30 is advanced distally relative to the body portion 32 so that the distal end 92 of the plug power rod 90 is received within the power rod receiver 148 and spaced proximally from the proximal end 146 of the medial power rod 140. The plug support rods 88 are aligned with the body support rods 130. Also, tubes 70 are received in tube receivers 74 and abut the proximal carriage end block 102. In this configuration opposing ends of the contact rods 104 are disposed within the battery spaces 71 and are spring-biased toward one another so as to hold the batteries 26 securely in electrical contact with one another. As clarified in FIG. 10, the wires 114 connect the contact rods 104 to one another so that the batteries 26 are arranged electrically in series when disposed within the battery spaces 71. The series circuit also extends through the proximal power rod 90 and medial power rod 140 and to the power conditioner 160. Since the distal end 92 of the plug power rod 90 is spaced from the proximal end 146 of the medial power rod 140, this circuit is interrupted in the configuration shown in FIG. 9.

Figure 2:
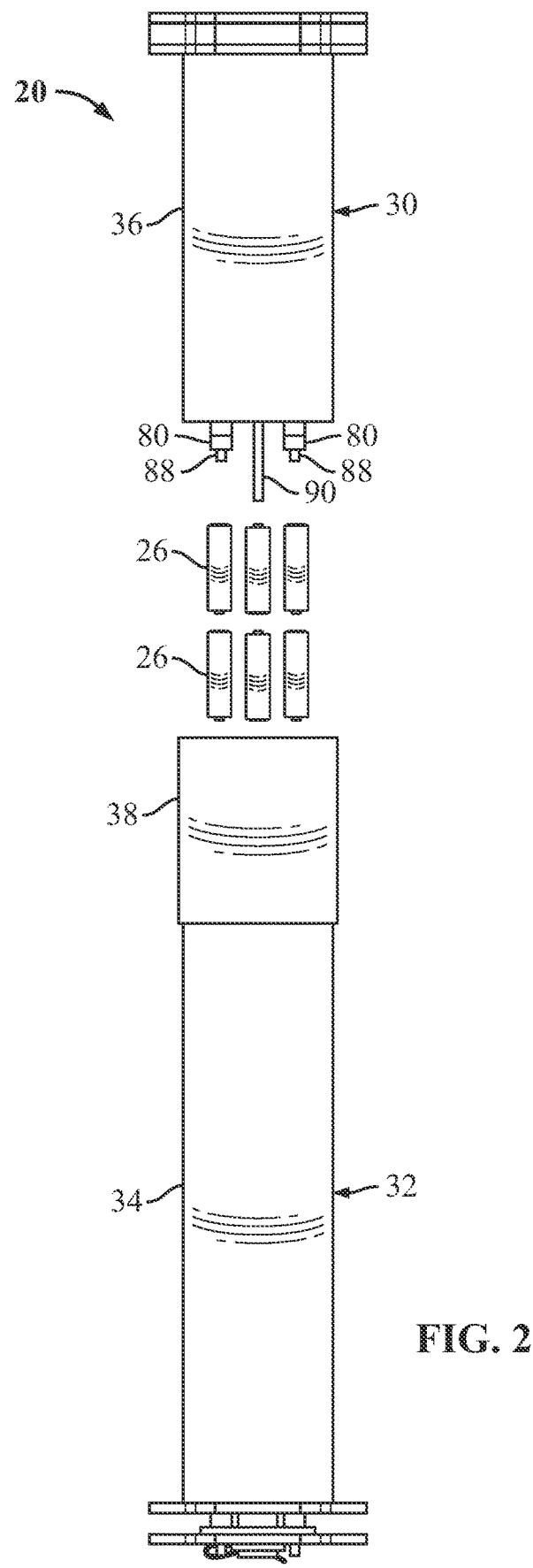
FIG. 2 shows the battery pack of FIG. 1 partially disassembled.

Notably, since the plug portion 30 is removable from the body portion 32, as depicted in FIGS. 2, 6, and 7, batteries 26 can be removed and replaced. As such, when the batteries 26 are discharged, they can be replaced by fresh batteries 26. To replace the batteries, a user would first loosen the ratchet 62 and remove the securement straps 60 from the proximal flange 40. The securement straps 60 can remain attached to the distal flange 42. Plug 30 can then be removed from the body portion 32 (see FIGS. 6 and 7). The discharged batteries 26 can then be removed from the battery tubes 70. As discussed above, and with reference to FIG. 5, fresh batteries from the spare tubes 64 can be placed in the battery tubes 70 immediately so that the battery pack 20 can continue to be used. The discharged batteries can be discarded or, preferably, placed in the spare tube 64 so that they can be recharged when recharging equipment is available.

It is to be understood that various types of batteries can be used. In the illustrated embodiment, 17650-sized Lithium-ion protected rechargeable batteries can be employed. As is known, protected versions of such batteries can be expected to be somewhat longer than unprotected versions in order to accommodate the protection circuitry. Preferably, the contact rods 104 and associated biasing springs 106 are configured to accommodate both protected and unprotected 17650 batteries. Thus, the biasing springs 106 are sized and configured with enough compression space to accommodate both versions of this battery size and to bias the contact rods 104 into contact with either size battery 26 to ensure a consistent contact characteristic notwithstanding bumps and jolts that may be experienced by virtue of the battery pack 20 being used in remote environments.

Since spent batteries 26 can be removed and replaced with fresh, fully-charged batteries 26, the present battery pack 20 remains usable even after the first set of batteries 26 have spent all their power. This is in contrast to a traditional power pack in which a battery is sealed within a housing, which requires the traditional power pack to be removed from service while the battery is recharged.

Further, since the series-connected batteries 26 can be removed, they can be independently recharged and also reevaluated when not in use. If it is discovered that one of the batteries is not performing properly, that particular battery can be discarded and replaced with a healthy battery.

This is in contrast to power packs in which batteries are sealed within a housing and inaccessible, in which a single malfunctioning battery can ruin the entire power pack.

Figure 11:
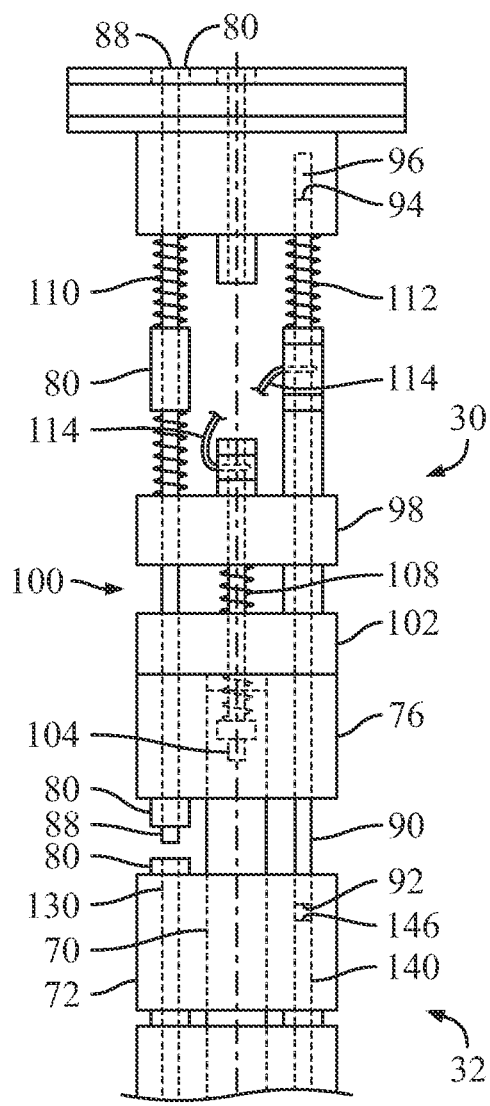
FIG. 11 is a close up view of the battery pack of FIG. 9 with the battery pack switch in an open configuration.
Figure 12:
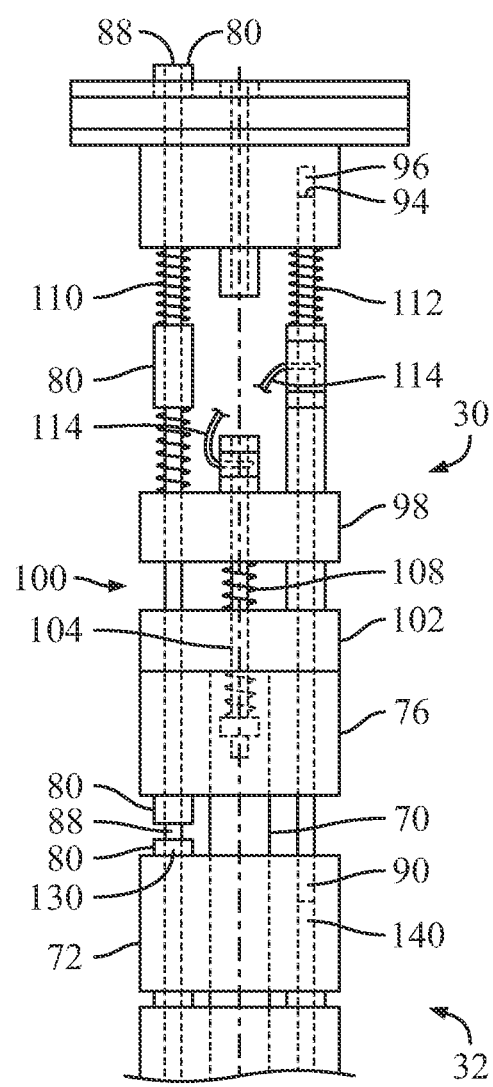
FIG. 12 is a close up view of the battery pack of FIG. 9 with the battery pack switch in a closed configuration.

With reference next to FIGS. 11 and 12, close-up views of the proximal portion of the battery pack 20 are depicted. FIG. 11 is similar to FIG. 9 in that it shows an at-rest configuration in which the distal end 92 of the plug power rod 90 is spaced from the proximal end 146 of the medial power rod 140. Due to the bias of the proximal suspension springs 110, which urge the proximal block 78 proximally relative to the body portion 32, when the plug 30 is joined with the body 32 in an at-rest configuration without any force pushing on the proximal flange 40, the distal end 92 of the plug power rod 90 is spaced from the proximal end 146 of the medial power rod 140, and the battery circuit is interrupted. As such, the battery pack 20 is biased to an interrupted or off configuration. In some embodiments, the proximal springs 110 and the proximal and distal power rod springs 112, 150 can be configured so that, when the plug 30 and body 32 are in the at-rest configuration, at least one set of biasing springs 106 are spaced from the batteries 26. As such, the batteries 26 in different battery spaces 71 are disconnected from each other and thus are at little or no threat of being unintentionally drained, or of being drained/damaged by any short circuit within the system.

With reference next specifically to FIGS. 11 and 12, the battery pack 20 is configured so that when a compressive force is applied between the proximal and distal flanges 40, 42, the plug 30 is urged distally relative to the body 32, urging the distal end 92 (see FIG. 11) of the plug power rod 90 closer to contact with the proximal end 146 of the medial power rod 140. The distal ends of the plug support rods 88 can be urged into contact with the proximal ends of the body support rods 130. Further compression will compress the proximal suspension springs 110, enabling the proximal power rod 90 to be advanced further so that the distal end 92 of the plug power rod 90 is in firm contact with the proximal end 146 of the medial power rod 140. In such a configuration, the proximal power rod spring 112 and distal power rod spring 150 can be compressed, resulting in the power rods 90, 140 being urged tightly into engagement with one another. With the power rods 90, 140 so engaged, the circuit is completed, and the electrical outlet 46 thus is activated, or "on", and ready for use. Notably, during such compression, the proximal flange 40 may be urged distally sufficient so that the proximal ends of the plug support rods 88, and associated stops 80, may become spaced proximally from the outer flange portion 86, as depicted in FIGS. 5 and 12. Also, preferably the proximal suspension springs 110 need not be fully compressed in order to put the plug power rod 90 into contact with the medial power rod 140. As such, in the even that there are impacts to the battery pack 20, such as bumps typical to transport in remote areas, impact forces can be at least partially absorbed by the proximal suspension springs 110, as well as the proximal power rod spring 112 and distal power rod spring 150, so that the rods 90, 140 are maintained in uninterrupted contact with one another.

Although longitudinal compression of the battery pack 20 can be accomplished by hand, most preferably, it is accomplished using the securement straps 60 and ratchet 62. With specific reference to FIG. 5, a compression structure can be provided outside of the battery pack 20 so as to longitudinally compress the battery pack 20 in order to complete the circuit and activate the electrical outlet 46. In the illustrated embodiment, the compression structure includes the securement straps 60 and ratchet 62. More specifically, straps 60 extend from the distal flange 42 up to and over the proximal flange 40 and then back down the opposite side of the battery pack 20 to the ratchet 62, and from the ratchet 62 to the distal flange 42 again. Actuating the ratchet 62 can tighten the securement straps 60 so as to compress battery pack 20, urging the plug portion 30 longitudinally distally relative to the body portion 32 sufficient so that the plug power rod 90 engages the medial power rod 140, activating the battery pack 20 so that the electrical outlet 46 is energized. When the user wishes to deactivate the electrical outlet 46, ratchet 62 can be released. Proximal suspension springs 110 will then urge the plug 30 proximally relative to the body portion 32, disengaging the plug power rod 90 from the medial power rod 140 (FIG. 11). As such, the plug power rod 90 and medial power rod 140 effectively function as an on/off switch for the electrical outlet 46, even though no part of the switch is accessible from outside the battery pack 20.

With reference again specifically to FIG. 9, when the plug portion 30 is installed upon the body portion 32, a carriage 170 is defined extending from the proximal carriage end block 102 to the distal carriage end block 126. The battery tubes 70 are enclosed within carriage 170, as well as the proximal carriage end block 102 and distal carriage end block 126, which abut opposite ends of carriage 170. As discussed above, three proximal carriage suspension springs 108 (one aligned with each battery tube 70) are disposed in the proximal carriage suspension space 100 between the proximal carriage end block 102 and the proximal suspension block 98. Three distal carriage suspension springs 136 (one aligned with each battery tube 70) are disposed in the distal carriage suspension space 135 between the distal carriage end block 126 and the distal suspension block 124. Thus, carriage 170 is suspended by the suspension springs 108, 136, which also bias the proximal carriage end block 102 and distal carriage end block 126 against opposing ends of the battery tubes 70. As such, the batteries 26, which are already spring-suspended by the spring-biased contact rods 104, are further spring-suspended by the proximal and distal carriage suspension springs 108, 136 so as to protect the carriage 170 and its contents from shocks resulting from bumps, drops, and impacts that may be taken by the battery pack 20. More specifically, it is anticipated that the battery pack 20 will be subjected to impacts during use or transportation, such as due to being dropped, bumped, or the like. Jarring motions can also be anticipated. The carriage suspension springs 108, 136 will at least partially isolate the carriage 170 from such impact forces and jarring motions, thus protecting the batteries 26.

The battery spaces 71 are biased to a generally closed condition (see FIG. 9), blocking substances from entering the battery spaces, 71. Also, in the event that a battery 26 is compromised and ruptures, resulting in a runaway chemical reaction, battery substances can be blocked from flowing unrestrictedly out of the battery space 71 and fouling the rest of the battery pack 20. However, in the case of such a runaway chemical reaction, superheated gasses preferably can escape the battery spaces 71, and excessive pressure buildup within the battery spaces 71 will be avoided. In the illustrated embodiment, the proximal carriage suspension springs 108 act on the carriage 170, but are supported by the proximal suspension block 98, while the distal carriage suspension springs 136 act on the carriage 170, but are supported by the distal suspension block 124. Thus, the proximal suspension block 98 and distal suspension block 124 function as a support structure for the suspended carriage 170 and associated springs 108, 136. Also, in the illustrated embodiment, the contact rods 104 are movably supported by the proximal suspension block 98 and distal suspension block 124.

With particular reference again to FIGS. 2, 6 and 7, the tubular housing 28 preferably is constructed of a tough material that can absorb impacts, scrapes and the like without breaking. In a preferred embodiment the tubular housing 28 is constructed of aluminum tubing (such as 6061 T6 aluminum) having a thickness of about 1/16-1/4 inch, and more preferably about 1/8 inch. As such, the tubular housing 28 is configured to withstand impacts, and distribute impact forces throughout the housing 28, protecting the electronic components within the housing 28. With additional reference again to FIGS. 8 and 9, the blocks 72, 76, 78, 98, 102, 120, 122, 124, 126, preferably are shaped complementarily to the inner surface of the tubular housing 28. As such, the tubular housing 28 can be slid over the surfaces of the blocks, preferably with effort so that a seal is formed between the housing 28 and the blocks 72, 76, 78, 98, 102, 120, 122, 124, 126. As such, environmental contaminants are thus blocked from entering the battery pack 20, and fouling the internal components. In additional embodiment an o-ring or other seal can also be provided adjacent the flanges 40, 42. Most preferably, however, the tight fit between the housing 28 and blocks provides a hermetic seal protecting the internal components. Also, due to the tight fit between the housing 28 and blocks, internal components of the battery pack 20 thus fit snugly within the tubular housing 28, and forces from impacts to the exterior of the housing 28 can be distributed across both the housing 28 and the blocks.

As discussed above, the plug tube 36 of the housing 28 fits within the connector tube 38, which is adhered to the body tube 34 (see FIG. 2). In addition to the plug tube 36 fitting tightly within the connector tube 38, preferably a sealant is applied to the inside surface of the connector tube 38 to more thoroughly establish a seal between the outer surface of the plug tube 36 and the inner surface of the connector tube 38. In one embodiment, the sealant is a grease. Since the housing 28 sealingly covers the internal components of the battery pack 20, such internal components are protected from incursion of environmental contaminants, such as dust, and the battery pack 20 can even be resistant to water incursion.

In some embodiments one, more or all of the blocks 72, 76, 78, 98, 102, 120, 122, 124, 126 are formed of a durable plastic, most preferably an ultra high molecular weight polyethylene (UHMWPE). However, other materials, such as other polymers, hard rubbers or the like can be used. Also, as desired, different blocks can be made of different materials. In some embodiments each block can be a solid block of the selected material.

Figure 13:
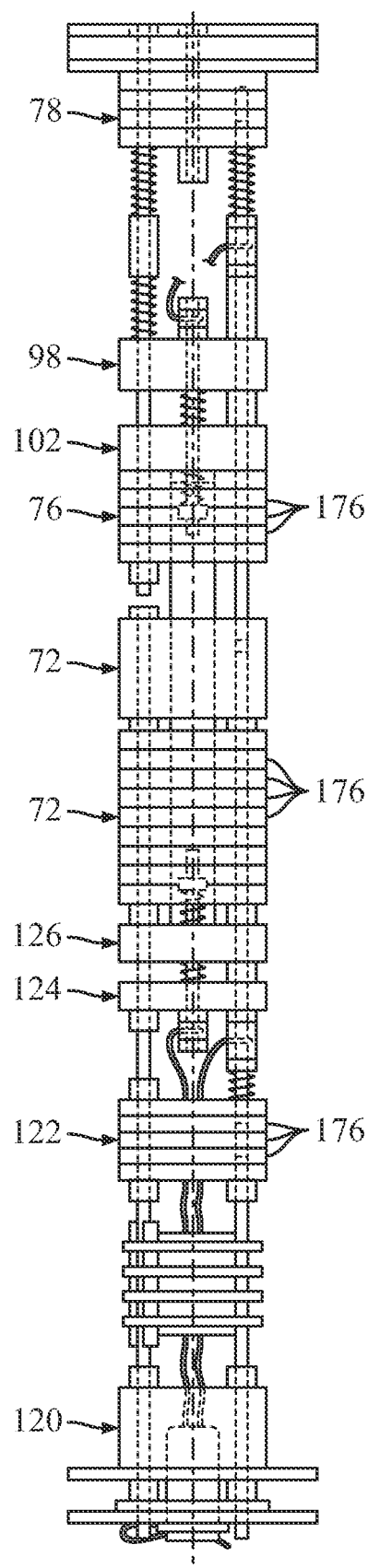
FIG. 13 shows another embodiment of the battery pack of FIG. 9.

With reference to FIG. 13, in another embodiment, one or more of the blocks 72, 76, 78, 98, 102, 120, 122, 124, 126 are made up of multiple disks 176 stacked vertically upon one another. Some of the disks 176 may be of one material (such as an acrylic), while some of the disks may be constructed of a different material (such as UHMWPE). In a preferred embodiment, all or substantially all of the disks 176 are formed of UHMWPE. Further, in a preferred embodiment the adjacent disks 176 are stacked tightly against one another, but are not adhered to one another. In the illustrated embodiments, blocks are made up of a plurality of disks that are supported by support rods 88, 130 and sandwiched between stops. While this construction is strong and reliable, it is also somewhat flexible. For example, if the battery pack 20 were subjected to twisting force about its longitudinal axis (such as the proximal flange 40 rotating relative to the distal flange 42), the internal structure, including the blocks, would be able to twist somewhat in response. Thus, twisting impact forces can be absorbed by the battery pack 20 without causing breakage of internal components or interference with power delivery. Similarly, in the event of a side impact to the battery pack 20, when a portion of the impact force is communicated to one of the blocks, the disks 176 within that block can move slightly relative to one another, helping to absorb the impact force. This twist-based impact resistance complements the linear impact energy absorption provided by the support rods 88, 130 and springs 106, 108, 110, 112, 136, 150. Also, in the event of a battery rupture failure leading to a runaway chemical reaction generating hot gases, the tightly-stacked disks 176 can allow escape of such hot gases—avoiding excessive pressure buildup—while generally containing solid and liquid battery components within the battery spaces 71.

The above description is given by way of example, and not limitation. Given the above disclosure, one skilled in the art could devise variations that are within the scope and spirit of the invention disclosed herein, such as described below. Further, the various features of the embodiments disclosed herein can be used alone, or in varying combinations with each other and are not intended to be limited to the specific combination described herein. Thus, the scope of the claims is not to be limited by the illustrated embodiments.

In the illustrated embodiments specifically discussed herein, the battery pack 20 is elongated and tubular and is configured to be part of a battery-based power supply system 50 that can be worn as a backpack. It is to be understood that the principles and structure described herein can be used in other configurations. For example, in other embodiments the battery pack can have a different form factor, such as a cube shape. Further, while the illustrated embodiment employed support rods with stops, several other types of structure, such as brackets and fasteners, can be used to block certain parts of the battery pack from moving relative to one another, while defining a carriage portion that may be suspended by springs relative to other portions of the structure. Further, other embodiments may employ traditional electrical switch structures rather than rods, which traditional electrical switch structures can still be actuated by compression applied to outside of the battery pack. And further, while the illustrated embodiment compressed longitudinally when completing the internal switch structure, other embodiments can operate somewhat differently, such as by rotating about a hinged portion when subjected to compression. Still other configurations and specific structure can also be contemplated which can apply principles discussed herein.

What is claimed is:

1. A portable battery pack, comprising:
   a housing enclosing a plurality of batteries arranged in a circuit so as to power an electrical outlet, the electrical outlet being accessible through the housing;
   a carriage disposed within the housing, the carriage configured to support the plurality of batteries and a plurality of contacts that are biased into electrical contact with the batteries; and
   a support structure having a first portion and a second portion, the carriage being suspended by springs between the first portion and the second portion;
   wherein the carriage is at least partially protected from impact forces that may be imparted to the housing;

wherein each of the plurality of contacts comprises an elongated rod that is spring biased toward an adjacent one of the plurality of batteries.

2. The portable battery pack of claim 1, wherein the carriage comprises a plurality of blocks that support a plurality of tubes, each tube configured to hold a plurality of batteries.

3. The portable battery pack of claim 2, wherein the carriage comprises opposing end blocks, and each end block closes opposing ends of the tubes.

4. The portable battery pack of claim 1, wherein the batteries are arranged in an electrical series configuration.

5. A portable battery pack, comprising:
a housing enclosing a plurality of batteries arranged in a circuit so as to power an electrical outlet, the electrical outlet being accessible through the housing;
a carriage disposed within the housing, the carriage configured to support the plurality of batteries and a plurality of contacts that are biased into electrical contact with the batteries: and
a support structure having a first portion and a second portion, the carriage being suspended by springs between the first portion and the second portion;
wherein the carriage is at least partially protected from impact forces that may be imparted to the housing
wherein the carriage comprises opposing end blocks, and each end block closes opposing ends of tubes;
wherein the end blocks each comprise a plurality of separately formed disks that are stacked upon one another and held together without adhesive.

6. A portable battery pack, comprising:
a housing enclosing a plurality of batteries arranged in a circuit so as to power an electrical outlet, the electrical outlet being accessible through the housing;
a carriage disposed within the housing, the carriage configured to support the plurality of batteries and a plurality of contacts that are biased into electrical contact with the batteries; and
a support structure having a first portion and a second portion, the carriage being suspended by springs between the first portion and the second portion;
wherein the carriage is at least partially protected from impact forces that may be imparted to the housing,
wherein the carriage comprises a plurality of blocks that support a plurality of tubes, each tube configured to hold a plurality of batteries;
wherein the batteries are arranged in an electrical series configuration;
a first switch structure enclosed within the housing and connected electrically in series with the batteries, and a second switch structure enclosed within the housing and electrically communicating with the electric outlet so that the electric outlet is energized when the first switch structure is in contact with the second switch structure;
wherein a switch biasing spring within the housing biases the first switch structure away from the second switch structure.

7. The portable battery pack of claim 6, wherein the housing has a first portion and a second portion, the first portion being movable relative to the second portion, the housing configured so that when the housing is compressed, the first portion moves relative to the second portion so as to overcome the switch biasing spring and place the first switch structure into contact with the second switch structure.

8. The portable battery pack of claim 7 in combination with a compression structure configured to compress the first portion of the housing relative to the second portion of the housing to a compressed configuration sufficient to place the first switch structure in contact with the second switch structure and to maintain the housing in the compressed configuration.

9. The portable battery pack of claim 8, wherein the compression structure comprises one or more straps configured to be tightened by a ratchet.

10. A portable battery pack, comprising:
a first portion and a second portion, the first portion being movable between an engaged configuration in which the first portion engages the second portion, and a removed configuration in which the first portion is removed from the second portion;
an electric outlet accessible from outside the first and second portions;
at least one battery tube defined in the second portion, the battery tube being configured to hold a plurality of batteries so that a first pole of the plurality of batteries is electrically connected to the electric outlet;
a contact member carried by the first portion and being configured so that when the first portion is in the engaged configuration the contact member is electrically engaged with a second pole of plurality of batteries;
a first switch member disposed in the first portion and electrically communicating with the contact member;
a second switch member disposed in the second portion and electrically communicating with the electric outlet;
wherein when the first and second portions are in the engaged configuration, the first portion is movable between a first position and a second position, the first switch member being spaced from the second switch member in the first position, the first switch member being in contact with the second switch member in the second position, and wherein the first portion is biased toward the first position; and
wherein in the second position the batteries are electrically connected to the electric outlet so that the electric outlet is energized.

11. The portable battery pack of claim 10, wherein a housing encloses the battery pack so that the first switch member and second switch member are not accessible from outside the housing, the housing comprising a first housing member and a second housing member that are movable relative to one another.

12. The portable battery pack of claim 11, wherein the housing is configured so that longitudinally compressing the housing moves the first portion from the first position to the second position.

13. The portable battery pack of claim 12, wherein the first portion is constrained to move only longitudinally between the first position and the second position.

14. The portable battery pack of claim 10, wherein a switch biasing spring within a housing biases the first portion to the first position.

15. The portable battery pack of claim 10, wherein the first switch member comprises an elongated rod.

16. The portable battery pack of claim 15, wherein the second portion comprises a block comprising a non-conductive material, the block having a longitudinally extending receiver space, and wherein the elongated rod fits into the receiver space when the first portion and second portion are in the engaged configuration, the receiver space configured to constrain the elongated rod to move only longitudinally.

* * * * *